US012619753B2

(12) United States Patent
Chukkapalli et al.

(10) Patent No.: US 12,619,753 B2
(45) Date of Patent: May 5, 2026

(54) DYNAMIC TIME-BASED DATA ACCESS POLICY DEFINITION AND ENFORCEMENT

(71) Applicant: International Business Machines Corporation, Armonk, NY (US)

(72) Inventors: Sai Sree Laya Chukkapalli, Catonsville, MD (US); Shriti Priya, White Plains, NY (US); Julian James Stephen, Yorktown Heights, NY (US); Arjun Natarajan, Old Tappan, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 18/195,435

(22) Filed: May 10, 2023

(65) Prior Publication Data

US 2024/0378304 A1 Nov. 14, 2024

(51) Int. Cl.
*G06F 21/62* (2013.01)
*G06F 16/906* (2019.01)
(Continued)

(52) U.S. Cl.
CPC ........ *G06F 21/6218* (2013.01); *G06F 16/906* (2019.01); *G06F 21/552* (2013.01);
(Continued)

(58) Field of Classification Search
CPC .. G06F 21/6218; G06F 16/906; G06F 21/552; G06N 3/0442; G06N 3/08; G06N 20/00; H04L 63/1425
See application file for complete search history.

(56) References Cited

U.S. PATENT DOCUMENTS 9,894,100 B2 2/2018 Pernicha
10,798,132 B2 10/2020 Chen
(Continued)

FOREIGN PATENT DOCUMENTS

CN 107729799 A 2/2018
WO 2016110354 A1 7/2016
WO 2023284972 A1 1/2023

OTHER PUBLICATIONS

Chandramouli et al., Attribute-based Access Control for Microservices-based Applications Using a Service Mesh, NIST Special Publication 800-204B, Aug. 2021.
(Continued)

*Primary Examiner* — Moeen Khan
*Assistant Examiner* — Thomas A Carnes
(74) *Attorney, Agent, or Firm* — Garg Law Firm, PLLC; Rakesh Garg; Rakesh Roy

(57) ABSTRACT

Data access requests are grouped into a plurality of clusters according to an activity count within each of a plurality of time periods. Based on a time separating two clusters in the plurality of clusters, a time window in which a data access policy applies is defined. Using the plurality of data access requests, a forecasting model is trained to predict a volume of future data access requests, the training resulting in a trained forecasting model. A data access policy effective during the time window and conditioned on a threshold related to the volume of future data access requests is generated. Responsive to determining that a new data request meets a criterion of the data access policy, processing of the new data request is allowed.

17 Claims, 5 Drawing Sheets

(51) Int. Cl.

| | |
|---|---|
| *G06F 21/55* | (2013.01) |
| *G06N 3/0442* | (2023.01) |
| *G06N 3/08* | (2023.01) |
| *G06N 20/00* | (2019.01) |
| *H04L 9/40* | (2022.01) |

(52) U.S. Cl.
CPC ............. *G06N 3/0442* (2023.01); *G06N 3/08* (2013.01); *G06N 20/00* (2019.01); *H04L 63/1425* (2013.01)

(56) References Cited

U.S. PATENT DOCUMENTS

| | | | | |
|---|---|---|---|---|
| 11,290,494 | B2 | 3/2022 | Li et al. | |
| 11,411,974 | B2 | 8/2022 | Vittal | |
| 2013/0125199 | A1* | 5/2013 | Novak | G06Q 10/04 726/1 |
| 2014/0032758 | A1* | 1/2014 | Barton | G06F 21/6218 709/225 |
| 2016/0057249 | A1* | 2/2016 | Karthikeyan | H04L 43/062 709/219 |
| 2018/0084012 | A1* | 3/2018 | Joseph | H04L 63/20 |
| 2018/0300471 | A1* | 10/2018 | Jain | H04L 63/105 |
| 2019/0362248 | A1* | 11/2019 | Rogynskyy | G06Q 10/107 |
| 2020/0034330 | A1* | 1/2020 | Dantressangle | G06N 20/00 |
| 2022/0382469 | A1 | 12/2022 | Rath et al. | |
| 2025/0181745 | A1* | 6/2025 | Piao | G06F 21/6218 |

OTHER PUBLICATIONS

Preuveneers et al., Towards multi-party policy-based access control in federations of cloud and edge microservices, 2019 IEEE European Symposium on Security and Privacy Workshops (EuroS &PW), pp. 29-38, 2019.

Singh et al., Integration of Attribute-Based Access Control in Microservices Architecture, ICT Systems and Sustainability, pp. 681-690, Jan. 4, 2022.

Bhatt et al., Attribute-Based Access Control for AWS Internet of Things and Secure Industries of the Future, IEEE Access, vol. 9, pp. 107200-107223, Aug. 6, 2021.

Veloudis et al., Achieving security-by-design through ontology-driven attribute-based access control in cloud environments, Future Generation Computer Systems 93, Apr. 1, 2019.

* cited by examiner

*Fig. 2*

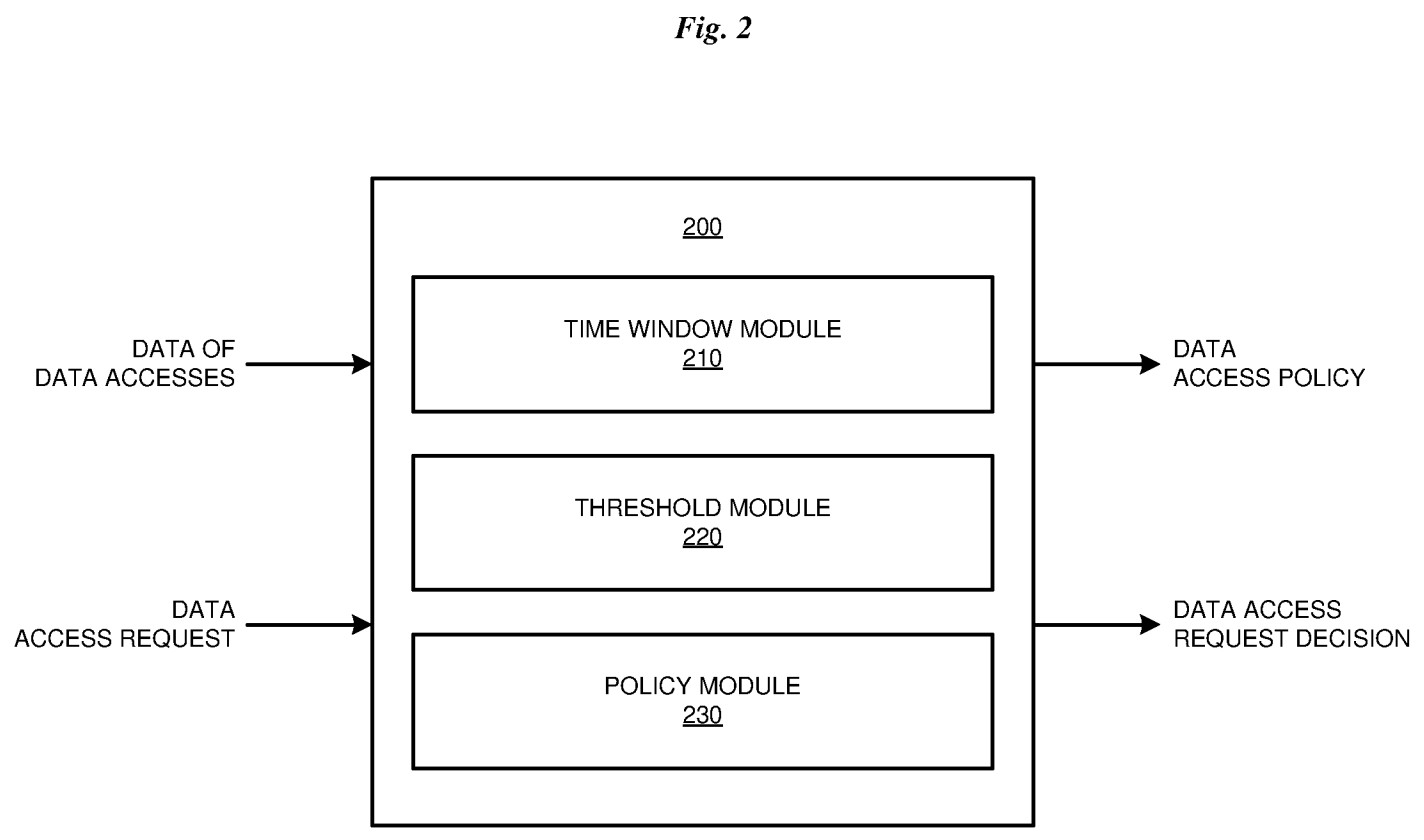

DATA ACCESS POLICY

DATA ACCESS REQUEST DECISION

200

TIME WINDOW MODULE
210

THRESHOLD MODULE
220

POLICY MODULE
230

DATA OF DATA ACCESSES

DATA ACCESS REQUEST

DYNAMIC TIME-BASED DATA ACCESS POLICY DEFINITION AND ENFORCEMENT

BACKGROUND

The present invention relates generally to a method, system, and computer program product for data access policy management. More particularly, the present invention relates to a method, system, and computer program product for dynamic time-based data access policy definition and enforcement.

A data access policy enforces controls on access to data. Some data access policies are put in place for security reasons-for example, limiting or disallowing access to data from a system outside a company's firewall. Other data access policies are put in place for privacy reasons—for example, limiting or disallowing access to personally identifiable (PII) data, except by a small subset of specially trained individuals who require such access to perform their jobs. A time-based data access policy, also called a temporal data access policy enforces a data access control that is related to time. A data request subject to a data access policy includes data with one or more attributes, and a data request subject to a time-based data access policy includes data with one or more temporal attributes. For example, some temporal attributes might be a time at which a user logs into a system, a time at which an application invokes an application programming interface (API) of another application, a time at which a database is read or written, and a time at which an application is deployed for use by other applications or a user. For example, a time-based data access policy might specify a maximum access rate for an asset (e.g., maximum 100 downloads per day), a number of accesses (e.g., only 50 simultaneous access for PII data), or access time windows (e.g., only 9 am-5 pm on weekdays).

The illustrative embodiments recognize that determining the parameters of a time-based data access control policy, including time windows when a policy applies and the thresholds that trigger a particular policy, relies on distinguishing a normal from an abnormal condition. For example, a hundred user logins to an office computer system between 8 and 8:15 am on weekdays, when most users begin work, might be considered normal and thus allowed by a data access policy, but a hundred user logins between 3 and 3:15 am, when almost no one typically works, might be an indicator of an attack on the system and thus should be disallowed by the data access policy.

However, distinguishing a normal from an abnormal condition is difficult. Timestamps can have many different values. For example, if daily user login times are being recorded with millisecond granularity, there can be as many values of data with a daily user login attribute as there are milliseconds in a day. Further, a data access policy typically controls hundreds or thousands of systems, each generating timestamped data. Thus, data policy officers often rely on ad hoc rules of thumb (e.g., no one should be working at 3 am, so only a very few user logins per minute are permitted then), which can be overprotective (hindering legitimate activity) or insufficiently protective (allowing illegitimate activity). In addition, usage patterns can change, necessitating a policy update, but such pattern changes are often not apparent until users are wrongly denied access and complain.

Thus, the illustrative embodiments recognize that there is a need to dynamically determine the parameters of a time-based data access control policy, including time windows when a policy applies and the thresholds that trigger a particular policy data, based on analysis of actual data, and update the policy automatically as conditions change.

SUMMARY

The illustrative embodiments provide a method, system, and computer program product. An embodiment includes a method that groups, into a plurality of clusters according to an activity count within each of a plurality of time periods, a plurality of data access requests. An embodiment defines, based on a time separating two clusters in the plurality of clusters, a time window in which a data access policy applies. An embodiment trains, using the plurality of data access requests, a forecasting model to predict a volume of future data access requests, the training resulting in a trained forecasting model. An embodiment generates a data access policy effective during the time window and conditioned on a threshold related to the volume of future data access requests. An embodiment allows, responsive to determining that a new data request meets a criterion of the data access policy, processing of the new data request. Thus, an embodiment provides a method for dynamic time-based data access policy definition and enforcement.

Another embodiment further comprises disallowing, responsive to determining that a new data request does not meet a criterion of the data access policy, processing of the new data request. Thus, the embodiment provides additional enforcement of a data access policy.

In another embodiment, the forecasting model comprises a long short-term memory. Thus, the embodiment provides additional detail of the forecasting model used in dynamic time-based data access policy definition and enforcement.

Another embodiment further comprises determining, subsequent to the training, that a prediction error of the trained forecasting model is above a first error threshold; retraining, using a second plurality of data access requests, the trained forecasting model to predict a second volume of future data access requests; and adjusting, to be conditioned on a second threshold related to the second volume of future data access requests, the data access policy. Thus, the embodiment provides additional detail of adjustment of a time-based data access policy.

Another embodiment further comprises determining that a volume of data access requests disallowed for not meeting a criterion of the data access policy exceeds a second error threshold; and adjusting, based on a second time separating two clusters in a second plurality of clusters, the time window in which the data access policy applies, the second plurality of clusters formed using a third plurality of data access requests. Thus, the embodiment provides additional detail of adjustment of a time-based data access policy.

Another embodiment further comprises determining that a volume of data access requests disallowed for not meeting a criterion of the data access policy exceeds a third error threshold; retraining, using a third plurality of data access requests, the trained forecasting model to predict a third volume of future data access requests; and adjusting, to be conditioned on a second threshold related to the third volume of future data access requests, the data access policy. Thus, the embodiment provides additional detail of adjustment of a time-based data access policy.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 2 depicts a block diagram of an example configuration for dynamic time-based data access policy definition and enforcement in accordance with an illustrative embodiment;

DETAILED DESCRIPTION

Figure 1:
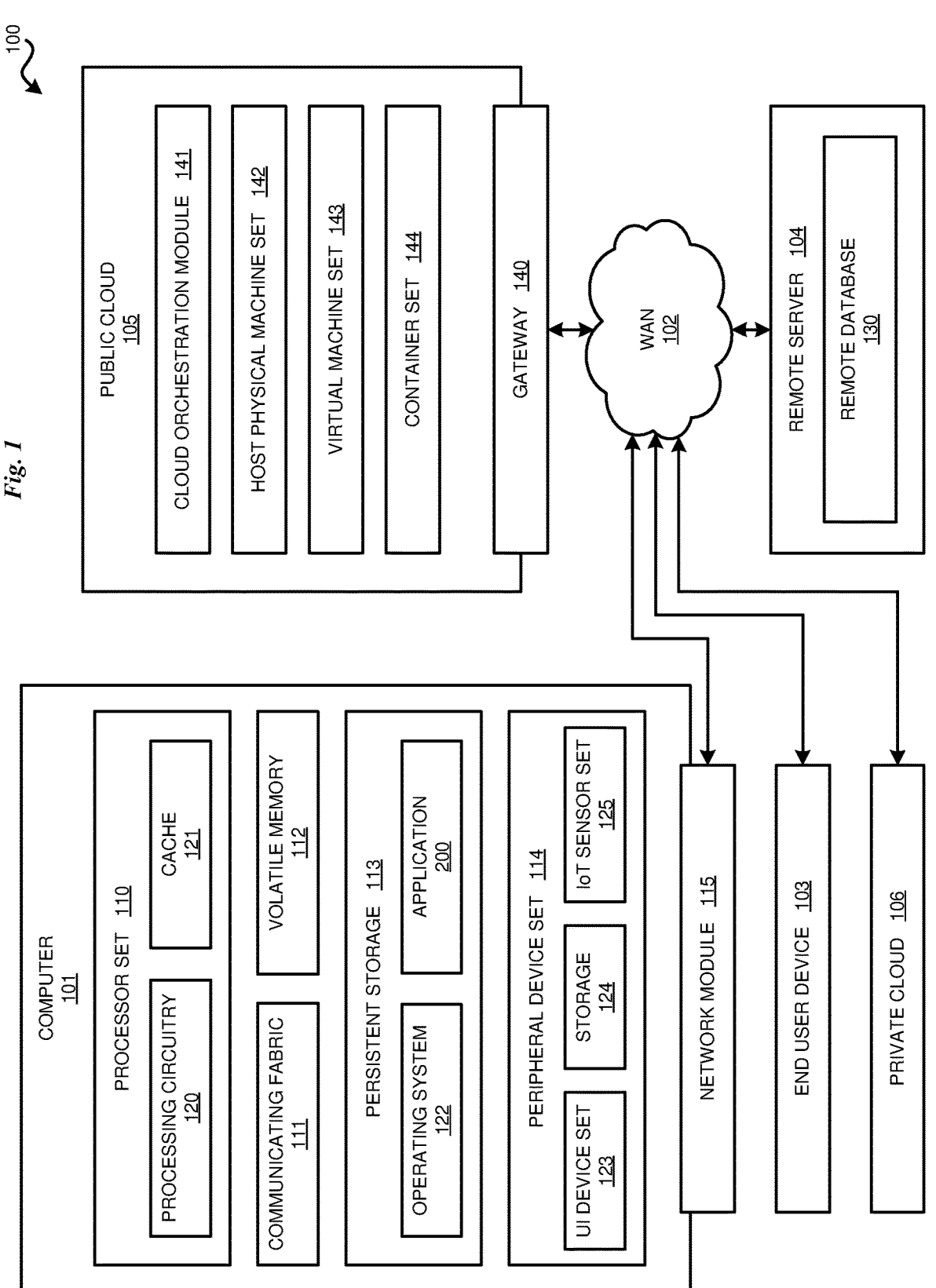
FIG. 1 depicts an example diagram of a data processing environments in which illustrative embodiments may be implemented.

The illustrative embodiments recognize that there is a need to dynamically determine the parameters of a time-based data access control policy, including time windows when a policy applies and the thresholds that trigger a particular policy data, based on analysis of actual data, and update the policy automatically as conditions change. The illustrative embodiments recognize that the presently available tools or solutions do not address these needs or provide adequate solutions for these needs. The illustrative embodiments used to describe the invention generally address and solve the above-described problems and other problems related to dynamic time-based data access policy definition and enforcement.

An embodiment can be implemented as a software application. The application implementing an embodiment can be configured as a modification of an existing data access policy enforcement or management system, as a separate application that operates in conjunction with an existing data access policy enforcement or management system, a standalone application, or some combination thereof.

Particularly, some illustrative embodiments provide a method that groups, into a plurality of clusters according to an activity count within each of a plurality of time periods, a plurality of data access requests; defines, based on a time separating two clusters in the plurality of clusters, a time window in which a data access policy applies; trains, using the plurality of data access requests, a forecasting model to predict a volume of future data access requests; generates a data access policy effective during the time window and conditioned on a threshold related to the volume of future data access requests; and allows, responsive to determining that a new data request meets a criterion of the data access policy, processing of the new data request.

An embodiment receives a plurality of data access requests for data stored on a system, or group of systems, to which a data access policy is intended to apply. One embodiment divides the plurality of data access requests into a training portion (used to generate data access policy parameters in a manner described herein) and a validation portion (used to validate generated data access policy parameters prior to production use).

An embodiment identifies temporal data access requests patterns within received data requests. For example, an embodiment might identify data access pattern during working and non-working hours in a typical office to be different from each other. An embodiment might also conduct a finer-grained analysis to identify patterns of access during lunch breaks. To identify such patterns, an embodiment might group 24 hours of data access requests into ten-minute-long groups, i.e., each group comprises ten minutes of the 24 hours of data access requests. An embodiment generates an activity count of the number of data requests in each time-based group. For example, in one time-based group there might be a thousand total data access requests. Another embodiment generates an activity count of the number of data requests, of a particular type, or having a particular attribute, in each time-based group. For example, in another time-based group there might be 100 user logins, 500 reads of data in a particular database, and 400 calls to a particular API.

An embodiment represents a time-based group by a point in a two-dimensional space, in which the x-coordinate represents a time range (e.g., 10 am-10:10 am, for data divided into ten-minute groups) and the y-coordinate represents an activity count within that time range. An embodiment uses a presently available clustering technique, for example k-means clustering, to group plotted time-based groups of data access requests into clusters. For example, one embodiment might form two clusters, one corresponding to activity counts characteristic of one type of time range (e.g., working hours) and the other corresponding to activity counts characteristic of another type of time range (e.g., non-working hours). In an embodiment that generates an activity count of the number of data requests, of a particular type or having a particular attribute, in each time-based group, the embodiment plots time-based groups having a particular type or attribute into a two-dimensional space, and groups plotted time-based groups of that type or attribute into clusters. One embodiment repeats the clustering for multiple types of data access requests, or data access requests having different attributes or attributes set to different values.

An embodiment defines a time window in which a data access policy applies based on a time separating different clusters. For example, if there are two clusters, one corresponding to activity counts characteristic of one type of time range (e.g., working hours) and the other corresponding to activity counts characteristic of another type of time range (e.g., non-working hours), an embodiment might use a time midway between the boundaries of the two clusters as the time at which a data access policy applicable to one type of time range (e.g., working hours) switches to a data access policy applicable to another type of time range (e.g., non-working hours). As another example, if there are two clusters, an embodiment might use, as the time at which a data access policy applicable to one type of time range (e.g., working hours) switches to a data access policy applicable to another type of time range (e.g., non-working hours), a time equidistant from the x-coordinates of the centroids of the two clusters. Other definitions of a time window in which a data access policy applies, based on a time separating two of the clusters, are also possible and contemplated within the scope of the illustrative embodiments.

An embodiment uses the plurality of data access requests to train a forecasting model to predict a volume of future data access requests. In particular, an embodiment divides time into epochs, and uses the plurality of data access requests in each of the last several epochs to train a forecasting model to predict how many data access requests there will be in the next epoch. One embodiment uses data of the last two epochs to train a forecasting model to predict how many data access requests there will be in the next epoch. For example, if each epoch is one hour long, an embodiment might use the data access requests in each of the last two hours to train a forecasting model to predict how many data access requests there will be in the next hour. One embodiment implements the forecasting model using a long short-term memory (LSTM), a presently available type of artificial recurrent neural network capable of learning order dependence in sequence prediction. The embodiment represents inputs to the LSTM and outputs from the LSTM as multidimensional numbers encoding a volume and attributes of data access requests.

An embodiment defines a threshold at which a data access policy applies based on a predicted volume of future data access requests. In other words, the predicted volume of future data access requests is considered normal behavior, and an actual volume of future data access requests that is sufficiently different from what is considered normal should be subject to different data access requirements. One embodiment defines a threshold at which a data access policy applies as a percentage above a predicted volume of future data access requests (e.g., ten or twenty percent above the predicted volume). Another embodiment defines a threshold at which a data access policy applies as a predefined number above a predicted volume of future data access requests (e.g., the predicted volume plus one hundred). Other threshold settings, based on a predicted volume of future data access requests, are also possible and contemplated within the scope of the illustrative embodiments. Another embodiment uses a plurality of data access requests, of a particular type or having a particular attribute, to train a forecasting model to predict a volume of future data access requests of that type or having that attribute, and uses the predicted volume to defines a threshold for a data access policy applicable to that type of data access request or data access requests having that attribute.

An embodiment generates a data access policy effective during the time window and conditioned on a threshold related to the predicted number of data access requests. For example, an embodiment might have determined that working hours are 8 am-6 pm, and non-working hours are outside that range, and that the predicted number of database accesses within working hours averages one thousand per hour while the predicted number of database accesses within working hours averages one hundred per hour. Thus, the embodiment might generate a data access policy that limits database accesses within the 8 am-6 pm time window to 1200 per hour, and limits database accesses outside the 8 am-6 pm time window to 120 per hour. An embodiment maintains a generated data access policy in a policy library.

An embodiment receives a new data access request and applies the generated data access policy to determine whether to allow or disallow the new data request. For example, if a data access policy limits database accesses within the 8 am-6 pm time window to 1200 per hour, and it is noon and database accesses are currently 600 per hour, an embodiment might allow a new database access request, while if there have already been 1200 database accesses within the past hour, an embodiment might disallow a new database access request. One embodiment applies data access policies in an order arranged by priority. If the embodiment disallows a data access request using a higher-priority policy, the embodiment need not evaluate the request against lower-priority policies, saving time. For example, if a data access request comes from a system on a disallowed list specified by a higher-priority data access policy, the request can be disallowed without reference to a time window specified in a lower-priority data access policy.

An embodiment periodically updates the time window of an existing data access policy. For example, an embodiment might repeat the clustering and time window definition described herein every 24 hours, using the past 24 hours of data access requests. Another embodiment updates the time window in response to a number, or rate, of disallowed data access requests, or disallowed time-based data access requests, that is above a threshold amount. A higher-than-desired number or rate of data access requests is an indicator that a data access policy could be restricting legitimate activity, and thus should be adjusted.

An embodiment periodically updates the threshold of an existing data access policy. For example, an embodiment might repeat the forecasting model training and threshold definition described herein every 24 hours, using the past 24 hours of data access requests. Another embodiment updates the threshold in response to a number, or rate, of disallowed data access requests, or disallowed time-based data access requests, that is above a threshold amount. Another embodiment determines a prediction error (i.e., a difference between predicted and actual volumes of future data access requests) of the forecasting model, and repeats the forecasting model training and threshold definition described herein in response to the prediction error exceeding a predefined threshold.

The manner of dynamic time-based data access policy definition and enforcement described herein is unavailable in the presently available methods in the technological field of endeavor pertaining to data access management. A method of an embodiment described herein, when implemented to execute on a device or data processing system, comprises substantial advancement of the functionality of that device or data processing system in grouping, into a plurality of clusters according to an activity count within each of a plurality of time periods, a plurality of data access requests; defining, based on a time separating two clusters in the plurality of clusters, a time window in which a data access policy applies; training, using the plurality of data access requests, a forecasting model to predict a volume of future data access requests; generating a data access policy effective during the time window and conditioned on a threshold related to the volume of future data access requests; and allowing, responsive to determining that a new data request meets a criterion of the data access policy, processing of the new data request.

The illustrative embodiments are described with respect to certain types of data access requests, types or attributes of data access requests, forecasting models, time windows, errors, forecasts, thresholds, validations, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a dynamic time-based data access policy definition and enforcement embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112. for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images. deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

With reference to FIG. 2, this figure depicts a block diagram of an example configuration for dynamic time-based data access policy definition and enforcement in accordance with an illustrative embodiment. Application 200 is the same as application 200 in FIG. 1.

Application 200 receives data of data access requests for data stored on a system, or group of systems, to which a data access policy is intended to apply. One implementation of application 200 divides the data access requests into a training portion (used to generate data access policy parameters in a manner described herein) and a validation portion (used to validate generated data access policy parameters prior to production use).

Time window module 210 identifies temporal data access patterns within received data requests. For example, module 210 might identify data access pattern during working and non-working hours in a typical office to be different from each other. Module 210 might also conduct a finer-grained analysis to identify patterns of access during lunch breaks. To identify such patterns, module 210 might group 24 hours of data access requests into ten-minute-long groups, i.e., each group comprises ten minutes of the 24 hours of data access requests. Module 210 generates an activity count of the number of data requests in each time-based group. For example, in one time-based group there might be a thousand total data access requests. Another implementation of module 210 generates an activity count of the number of data requests, of a particular type, or having a particular attribute, in each time-based group. For example, in another time-based group there might be 100 user logins, 500 reads of data in a particular database, and 400 calls to a particular API.

Module 210 represents a time-based group by a point in a two-dimensional space, in which the x-coordinate represents a time range (e.g., 10 am-10:10 am, for data divided into ten-minute groups) and the y-coordinate represents an activity count within that time range. Module 210 uses a presently available clustering technique, for example k-means clustering, to group plotted time-based groups of data access requests into clusters. For example, one implementation of module 210 might form two clusters, one corresponding to activity counts characteristic of one type of time range (e.g., working hours) and the other corresponding to activity counts characteristic of another type of time range (e.g., non-working hours). In an implementation of module 210 that generates an activity count of the number of data requests, of a particular type or having a particular attribute, in each time-based group, the implementation plots time-based groups having a particular type or attribute into a two-dimensional space, and groups plotted time-based groups of that type or attribute into clusters. One implementation of module 210 repeats the clustering for multiple types of data access requests, or data access requests having different attributes or attributes set to different values.

Module 210 defines a time window in which a data access policy applies based on a time separating different clusters. For example, if there are two clusters, one corresponding to activity counts characteristic of one type of time range (e.g., working hours) and the other corresponding to activity counts characteristic of another type of time range (e.g., non-working hours), module 210 might use a time midway between the boundaries of the two clusters as the time at which a data access policy applicable to one type of time range (e.g., working hours) switches to a data access policy applicable to another type of time range (e.g., non-working hours). As another example, if there are two clusters, module 210 might use, as the time at which a data access policy applicable to one type of time range (e.g., working hours) switches to a data access policy applicable to another type of time range (e.g., non-working hours), a time equidistant from the x-coordinates of the centroids of the two clusters. Other definitions of a time window in which a data access policy applies, based on a time separating two of the clusters, are also possible.

Threshold module 220 uses the plurality of data access requests to train a forecasting model to predict a volume of future data access requests. In particular, module 220 divides time into epochs, and uses the plurality of data access requests in each of the last several epochs to train a forecasting model to predict how many data access requests there will be in the next epoch. One implementation of module 220 uses data of the last two epochs to train a forecasting model to predict how many data access requests there will be in the next epoch. For example, if each epoch is one hour long. module 220 might use the data access requests in each of the last two hours to train a forecasting model to predict how many data access requests there will be in the next hour. One implementation of module 220 implements the forecasting model using an LSTM, and represents inputs to the LSTM and outputs from the LSTM as multidimensional numbers encoding a volume and attributes of data access requests.

Module 220 defines a threshold at which a data access policy applies based on a predicted volume of future data access requests. In other words, the predicted volume of future data access requests is considered normal behavior, and an actual volume of future data access requests that is sufficiently different from what is considered normal should be subject to different data access requirements. One implementation of module 220 defines a threshold at which a data access policy applies as a percentage above a predicted volume of future data access requests (e.g., ten or twenty percent above the predicted volume). Another implementation of module 220 defines a threshold at which a data access policy applies as a predefined number above a predicted volume of future data access requests (e.g., the predicted volume plus one hundred). Other threshold settings, based on a predicted volume of future data access requests, are also possible. Another implementation of module 220 uses a plurality of data access requests, of a particular type or having a particular attribute to train a forecasting model to predict a volume of future data access requests of that type or having that attribute, and uses the predicted volume to defines a threshold for a data access policy applicable to that type of data access request or data access requests having that attribute.

Policy module 230 generates a data access policy effective during the time window and conditioned on a threshold related to the predicted number of data access requests. For example, modules 210 and 220 might have determined that working hours are 8 am-6 pm, and non-working hours are outside that range, and that the predicted number of database accesses within working hours averages one thousand per hour while the predicted number of database accesses within working hours averages one hundred per hour. Thus, module 230 might generate a data access policy that limits database accesses within the 8 am-6 pm time window to 1200 per hour, and limits database accesses outside the 8 am-6 pm time window to 120 per hour. Module 230 maintains a generated data access policy in a policy library.

Module 230 receives a new data access request and applies the generated data access policy to determine whether to allow or disallow the new data request. For example, if a data access policy limits database accesses within the 8 am-6 pm time window to 1200 per hour, and it is noon and database accesses are currently 600 per hour, module 230 might allow a new database access request, while if there have already been 1200 database accesses within the past hour, module 230 might disallow a new database access request. One implementation of module 230 applies data access policies in an order arranged by priority. If module 230 disallows a data access request using a higher-priority policy, module 230 need not evaluate the request against lower-priority policies, saving time. For example, if a data access request comes from a system on a disallowed list specified by a higher-priority data access policy, the request can be disallowed without reference to a time window specified in a lower-priority data access policy.

Application 200 periodically updates the time window of an existing data access policy. For example, module 210 might repeat the clustering and time window definition described herein every 24 hours, using the past 24 hours of data access requests. Another implementation of application 200 updates the time window in response to a number, or rate, of disallowed data access requests, or disallowed time-based data access requests, that is above a threshold amount. A higher-than-desired number or rate of data access requests is an indicator that a data access policy could be restricting legitimate activity, and thus should be adjusted.

Application 200 periodically updates the threshold of an existing data access policy. For example, module 220 might repeat the forecasting model training and threshold definition described herein every 24 hours, using the past 24 hours of data access requests. Another implementation of application 200 updates the threshold in response to a number, or rate, of disallowed data access requests, or disallowed time-based data access requests, that is above a threshold amount. Another implementation of module 220 determines a prediction error (i.e., a difference between predicted and actual volumes of future data access requests) of the forecasting model, and repeats the forecasting model training and threshold definition described herein in response to the prediction error exceeding a predefined threshold.

Figure 3:
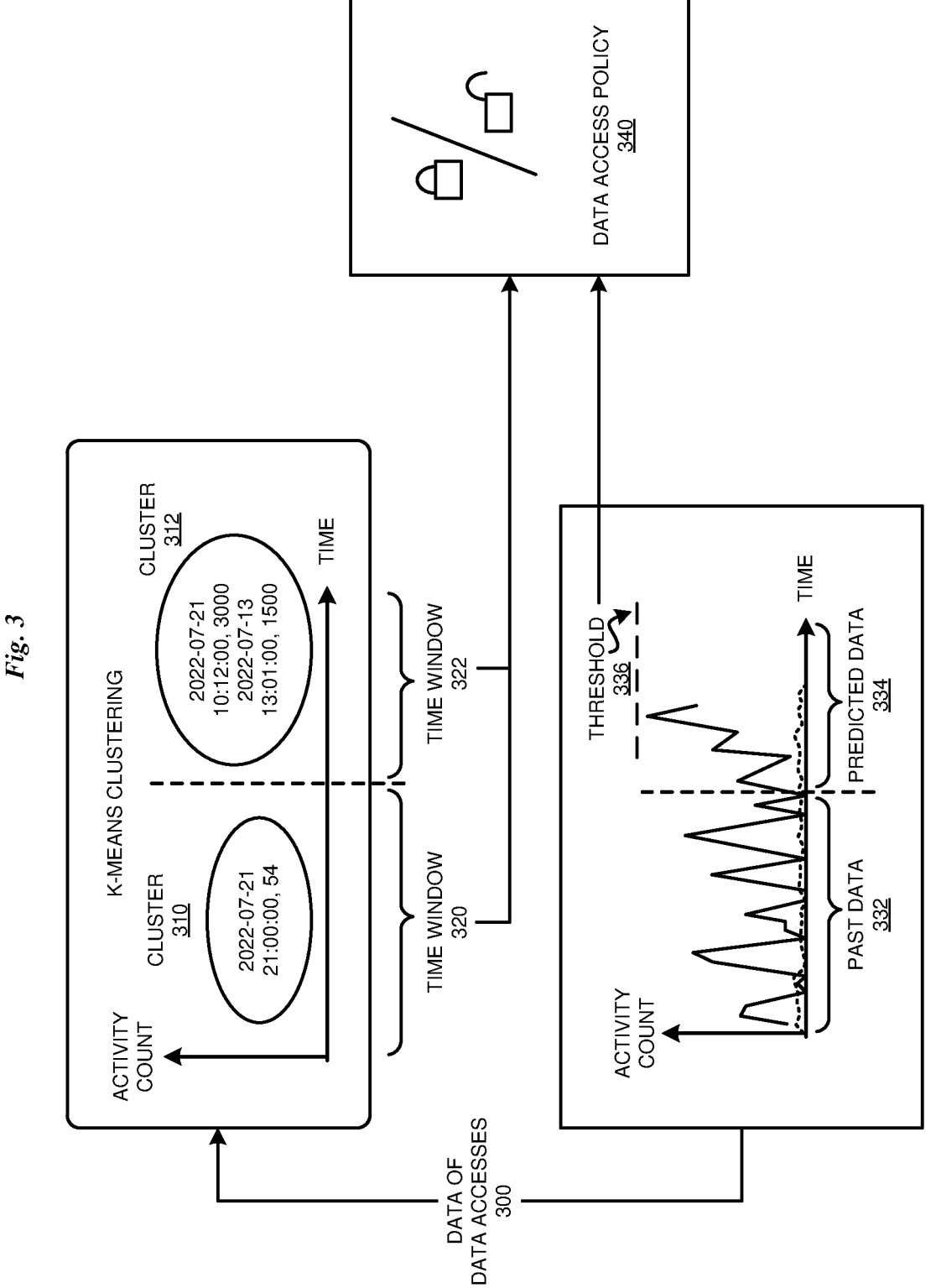
FIG. 3 depicts an example of dynamic time-based data access policy definition and enforcement in accordance with an illustrative embodiment.

With reference to FIG. 3, this figure depicts an example of dynamic time-based data access policy definition and enforcement in accordance with an illustrative embodiment. The example can be executed using application 200 in FIG. 1.

Application 200 receives data of data accesses 300, generates an activity count of the number of data requests in each time-based group, represents a time-based group by a point in a two-dimensional space, in which the x-coordinate represents a time range (e.g., 10 am-10:10 am, for data divided into ten-minute groups) and the y-coordinate represents an activity count within that time range, and uses a presently available clustering technique, for example k-means clustering, to group plotted time-based groups of data access requests into clusters (clusters 310 and 312).

Application 200 uses a time separating clusters 310 and 312 to define time windows 320 and 322.

Application 200 divides time into epochs, and uses data of data accesses 300 in each of the last several epochs (past data 332) to train a forecasting model to predict how many data access requests there will be in the next epoch (predicted data 334). Application 200 defines threshold 336, a threshold at which a data access policy applies, based on predicted data 334.

Application 200 uses time windows 320 and 322, and threshold 336, to generate data access policy 340.

Figure 4:
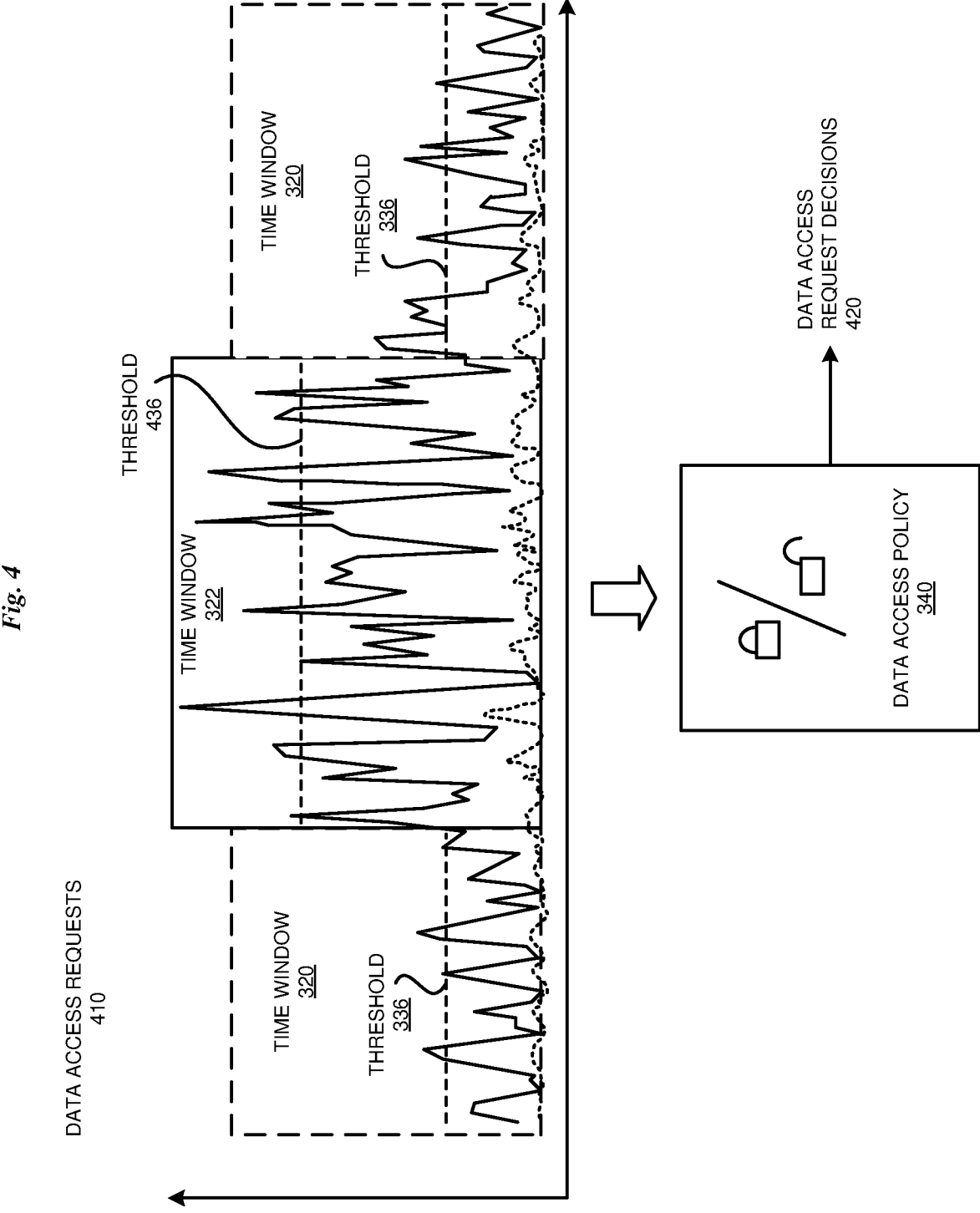
FIG. 4 depicts a continued example of dynamic time-based data access policy definition and enforcement in accordance with an illustrative embodiment.

With reference to FIG. 4, this figure depicts a continued example of dynamic time-based data access policy definition and enforcement in accordance with an illustrative embodiment. Time windows 320 and 322, threshold 336, and data access policy 340 are the same as time windows 320 and 322, threshold 336, and data access policy 340 in FIG. 3.

In particular, FIG. 4 depicts data access requests 410 in graph form. Data access requests 410 that are received in time window 320 are subject to threshold 336 in data access policy 340. Data access requests 410 that are received in time window 322 are subject to threshold 436 in data access policy 340. Data access requests 410 are allowed or disallowed according to data access policy 340, resulting in data access request decisions 420.

Figure 5:
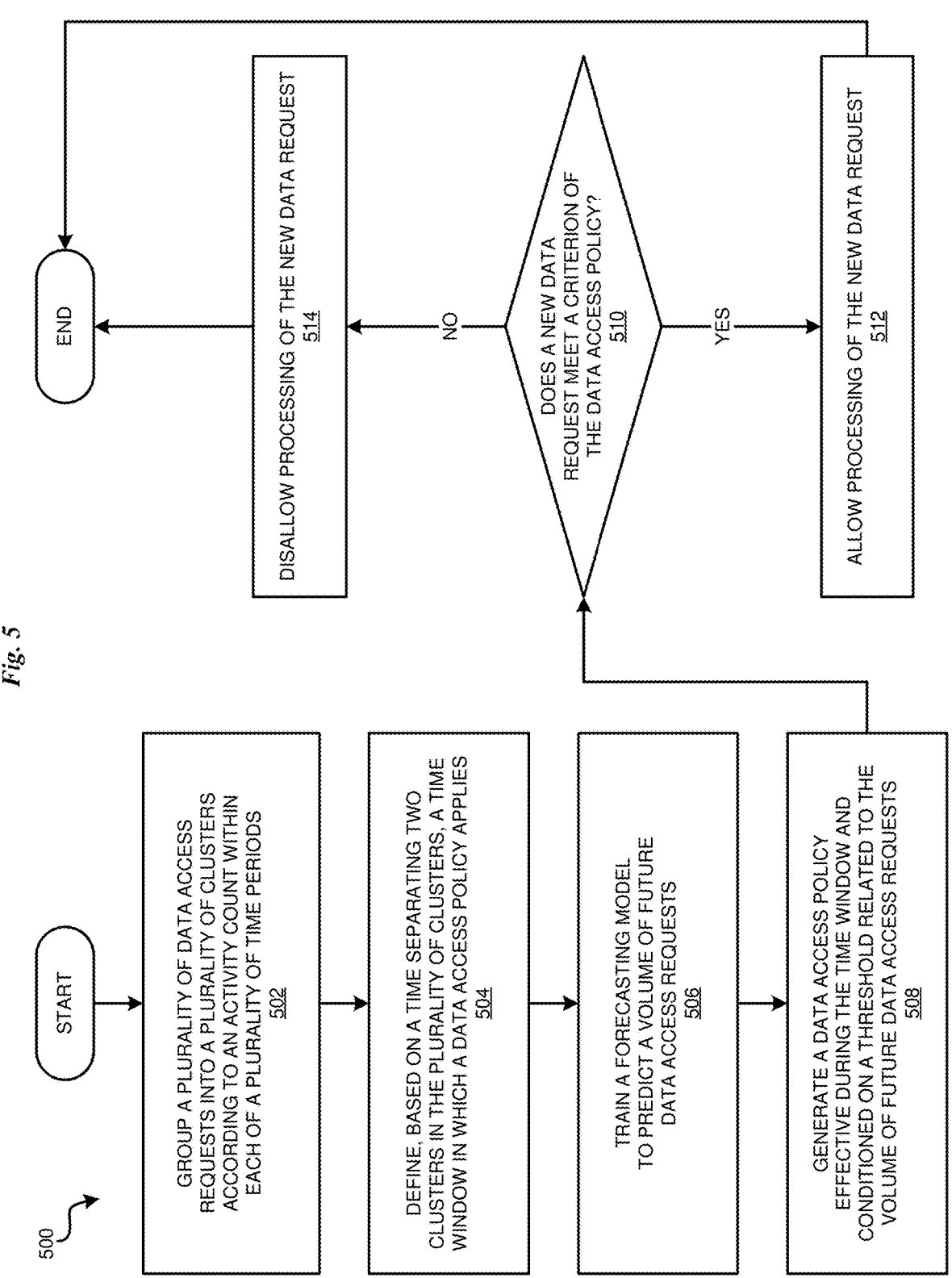
FIG. 5 depicts a flowchart of an example process for dynamic time-based data access policy definition and enforcement in accordance with an illustrative embodiment.

With reference to FIG. 5, this figure depicts a flowchart of an example process for dynamic time-based data access policy definition and enforcement in accordance with an illustrative embodiment. Process 500 can be implemented in application 200 in FIG. 2.

In block 502, the application groups a plurality of data access requests into a plurality of clusters according to an activity count within each of a plurality of time periods. In block 504, the application defines, based on a time separating two clusters in the plurality of clusters, a time window in which a data access policy applies. In block 506, the application uses the plurality of data access requests to train a forecasting model to predict a volume of future data access requests. In block 508, the application generates a data access policy effective during the time window and conditioned on a threshold related to the volume of future data access requests. In block 510, the application determines whether a new data request meets a criterion of the data access policy. In block 512 ("YES" path of block 510), the application allows processing of the new data request, then ends. In block 514 ("NO" path of block 510), the application disallows processing of the new data request, then ends.

Thus, a computer implemented method, system or apparatus, and computer program product are provided in the illustrative embodiments for dynamic time-based data access policy definition and enforcement and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:

grouping, into a plurality of clusters according to an activity count within each of a plurality of time periods, a plurality of data access requests;

defining, based on a time midway between boundaries separating two clusters in the plurality of clusters, a boundary for a time window in which a data access policy applies;

training, using the plurality of data access requests, a forecasting model to predict a volume of future data access requests, the training resulting in a trained forecasting model;

defining, based on a predicted volume of future data access requests, a threshold at which the data access policy applies generating the data access policy effective during the time window and conditioned on the threshold;

allowing, responsive to determining that a new data request meets a criterion of the data access policy, processing of the new data request; and disallowing, responsive to determining that the new data request does not meet the criterion of the data access policy, processing of the new data request.

2. The computer-implemented method of claim 1, wherein the forecasting model comprises a long short-term memory.

3. The computer-implemented method of claim 1, further comprising:

determining, subsequent to the training, that a prediction error of the trained forecasting model is above a first error threshold;

retraining, using a second plurality of data access requests, the trained forecasting model to predict a second volume of future data access requests; and adjusting, to be conditioned on a second threshold related to the second volume of future data access requests, the data access policy.

4. The computer-implemented method of claim 1, further comprising:

determining that a volume of data access requests disallowed for not meeting a criterion of the data access policy exceeds a second error threshold; and adjusting, based on a second time separating two clusters in a second plurality of clusters, the time window in which the data access policy applies, the second plurality of clusters formed using a third plurality of data access requests.

5. The computer-implemented method of claim 1, further comprising:

determining that a volume of data access requests disallowed for not meeting a criterion of the data access policy exceeds a third error threshold;

retraining, using a third plurality of data access requests, the trained forecasting model to predict a third volume of future data access requests; and adjusting, to be conditioned on a second threshold related to the third volume of future data access requests, the data access policy.

6. A computer program product comprising one or more computer readable storage medium, and program instructions collectively stored on the one or more computer readable storage medium, the program instructions executable by a processor to cause the processor to perform operations comprising:

grouping, into a plurality of clusters according to an activity count within each of a plurality of time periods, a plurality of data access requests;

defining, based on a time midway between boundaries separating two clusters in the plurality of clusters, a boundary for a time window in which a data access policy applies;

training, using the plurality of data access requests, a forecasting model to predict a volume of future data access requests, the training resulting in a trained forecasting model;

defining, based on a predicted volume of future data access requests, a threshold at which the data access policy applies;

generating the data access policy effective during the time window and conditioned on the threshold;

allowing, responsive to determining that a new data request meets a criterion of the data access policy, processing of the new data request; and disallowing, responsive to determining that the new data request does not meet the criterion of the data access policy, processing of the new data request.

7. The computer program product of claim 6, wherein the stored program instructions are stored in a computer readable storage device in a data processing system, and wherein the stored program instructions are transferred over a network from a remote data processing system.

8. The computer program product of claim 6, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

9. The computer program product of claim 6, wherein the forecasting model comprises a long short-term memory.

10. The computer program product of claim 6, further comprising:

determining, subsequent to the training, that a prediction error of the trained forecasting model is above a first error threshold;

retraining, using a second plurality of data access requests, the trained forecasting model to predict a second volume of future data access requests; and adjusting, to be conditioned on a second threshold related to the second volume of future data access requests, the data access policy.

11. The computer program product of claim 6, further comprising:

determining that a volume of data access requests disallowed for not meeting a criterion of the data access policy exceeds a second error threshold; and adjusting, based on a second time separating two clusters in a second plurality of clusters, the time window in which the data access policy applies, the second plurality of clusters formed using a third plurality of data access requests.

12. The computer program product of claim 6, further comprising:

determining that a volume of data access requests disallowed for not meeting a criterion of the data access policy exceeds a third error threshold;

retraining, using a third plurality of data access requests, the trained forecasting model to predict a third volume of future data access requests; and adjusting, to be conditioned on a second threshold related to the third volume of future data access requests, the data access policy.

13. A computer system comprising a processor and one or more computer readable storage media, and program instructions collectively stored on the one or more computer readable storage media, the program instructions executable by the processor to cause the processor to perform operations comprising:

grouping, into a plurality of clusters according to an activity count within each of a plurality of time periods, a plurality of data access requests;

defining, based on a time midway between boundaries separating two clusters in the plurality of clusters, a boundary for a time window in which a data access policy applies;

training, using the plurality of data access requests, a forecasting model to predict a volume of future data access requests, the training resulting in a trained forecasting model;

defining, based on a predicted volume of future data access requests, a threshold at which the data access policy applies;

generating the data access policy effective during the time window and conditioned on the threshold;

allowing, responsive to determining that a new data request meets a criterion of the data access policy, processing of the new data request; and disallowing, responsive to determining that the new data request does not meet the criterion of the data access policy, processing of the new data request.

14. The computer system of claim 13, wherein the forecasting model comprises a long short-term memory.

15. The computer system of claim 13, further comprising:

determining, subsequent to the training, that a prediction error of the trained forecasting model is above a first error threshold;

retraining, using a second plurality of data access requests, the trained forecasting model to predict a second volume of future data access requests; and adjusting, to be conditioned on a second threshold related to the second volume of future data access requests, the data access policy.

16. The computer system of claim 13, further comprising:

determining that a volume of data access requests disallowed for not meeting a criterion of the data access policy exceeds a second error threshold; and adjusting, based on a second time separating two clusters in a second plurality of clusters, the time window in which the data access policy applies, the second plurality of clusters formed using a third plurality of data access requests.

17. The computer system of claim 13, further comprising:

determining that a volume of data access requests disallowed for not meeting a criterion of the data access policy exceeds a third error threshold;

retraining, using a third plurality of data access requests, the trained forecasting model to predict a third volume of future data access requests; and adjusting, to be conditioned on a second threshold related to the third volume of future data access requests, the data access policy.

* * * * *